United States Patent [19]

Davidson

[11] Patent Number: 5,564,739
[45] Date of Patent: Oct. 15, 1996

[54] SIDE IMPACT AIRBAG MODULE WITH SOFT COVER

[75] Inventor: Phillip K. Davidson, Howell, Mich.

[73] Assignee: Takata, Inc., Auburn Hills, Mich.

[21] Appl. No.: 568,506

[22] Filed: Dec. 7, 1995

[51] Int. Cl.⁶ .................................................. B60R 21/26
[52] U.S. Cl. ........................ 280/736; 280/742; 280/730.2
[58] Field of Search .............................. 280/730.2, 736, 280/742, 740, 732, 728.1

[56] References Cited

U.S. PATENT DOCUMENTS

| | | | |
|---|---|---|---|
| 5,310,213 | 5/1994 | Mori | 280/728.2 |
| 5,335,936 | 8/1994 | Faigle et al. | 280/728.2 |
| 5,338,060 | 8/1994 | Soderquist | 280/728.2 |
| 5,340,147 | 8/1994 | Fontecchio et al. | 280/740 X |
| 5,346,248 | 9/1994 | Rhein et al. | 280/728.1 |
| 5,364,123 | 11/1994 | Abramczyk et al. | 280/728.2 |
| 5,458,364 | 10/1995 | Mueller et al. | 280/736 X |
| 5,487,560 | 1/1996 | Emambakhsh | 280/740 |
| 5,490,690 | 2/1996 | Mihm | 280/740 X |

FOREIGN PATENT DOCUMENTS

2251221  7/1992  United Kingdom ................... 280/736

Primary Examiner—Christopher P. Ellis
Attorney, Agent, or Firm—Harness, Dickey & Pierce, P.L.C.

[57] ABSTRACT

An improved side impact airbag module configured to be attached to the seat frame of a vehicle seat. The module consists of an inflator, an inflator plate, an airbag and a soft cover. The module is designed with a reduce number of airbag components and fasteners. The inflator plate comprises a longitudinal mounting flange, a redirecting flange and a mounting plate. The redirecting flange is configured to redirect and distribute gas generated by the inflator in response to a crash signal. The shape of the redirecting flange can be changed thus causing a change in the direction of airbag deployment. The airbag is configured for receiving the inflator plate/inflator assembly such that the airbag is in fluid communication with the inflator. A soft cover is included for enclosing the inflator plate, inflator and airbag in an undeployed position. The soft cover includes a tear seam configured to open during deployment of the airbag to allow the airbag to deploy outside of the module.

22 Claims, 7 Drawing Sheets

SIDE IMPACT AIRBAG MODULE WITH SOFT COVER

FIELD OF THE INVENTION

The present invention relates to motor vehicle safety devices. More particularly, the present invention relates to an inflatable restraint module adapted for side impact protection featuring design and assembly improvements.

BACKGROUND OF THE INVENTION

Restraint systems are now in widespread use in motor vehicles today. While seat belt systems provide a high degree of occupant impact protection, deployable impact protection devices such as inflatable airbags are now in commonplace use in motor vehicles. These systems incorporate a crash sensor which detects the onset of a vehicle collision and sends a crash signal to the inflatable restraint module. A source of gas is activated in response to the crash signal to inflate a fabric air cushion which is presented to absorb impact energy of the occupant within the vehicle. Such inflatable restraint systems are found mounted to steering wheels for driver side protection or mounted to instrument panel structure to provide protection for front seat passengers. These systems have been found to provide excellent occupant crash protection, particularly when used with a belt-type restraint system. Aiding in providing occupant protection for frontal impacts is the significant amount of deformable structure in the forward portion of the typical automobile. Moreover, today's crash sensors for sensing frontal impact provide reliable crash signals in a time period permitting deployment of the inflatable restraint system.

These advantages are not available when designing inflatable restraint systems for side impact collisions. Motor vehicle manufacturers and their suppliers of safety systems are increasingly focusing on deployable devices for providing side impact protection. Statistically, side impacts pose a greater probability of causing significant occupant injury as compared with frontal impacts. This difference is largely due to the limited energy absorption structure available in side impact situations, especially for "on side" occupants. In response to this concern, vehicle manufacturers and suppliers are developing side impact airbags which are mounted either to the door or body pillar structure, or to the seat back of the occupant seat. Similar to frontal impact systems, side impact systems incorporate a crash sensor which detects a side impact collision and generates a crash signal. In response to the crash signal, an inflator generates gas to inflate a woven fabric airbag which fills an area between the door and the occupant. The door structure acts as a "reaction plate" to support the airbag as it is compressed by the occupant thus providing energy absorption.

Numerous designs of inflatable restraint systems are available today. Current side impact modules are designed with similarities to passenger and driver frontal impact airbag modules. These modules are made up of many components including: a cushion, a cushion attachment, a retainer, and a cover. Also, current modules typically have many fasteners to attach the module components and to attach the module to the vehicle structure. Despite the effort exerted in optimizing the design of these devices, there is a continuing need to improve the manufacturability and cost of the systems while maintaining their reliability. Of significant importance is the reduction in the number of separate components which must be assembled to build the inflatable restraint system. The existence of a multiplicity of parts has a negative cost effect, both in terms of part fabrication and assembly.

In motor vehicle design today, size and mass constraints are of critical importance. This is especially true for the side frame area of an automobile body where there is a very tight packing space. To make effective use of packing volume in the automobile, it is desirable to reduce the overall size of an airbag module. In order to be cost effective, the design of a deployable side impact restraint device should be applicable across many vehicle platforms and provide low cost fabrication and assembly. Moreover, efforts to achieve benefits in these areas must not sacrifice the performance of the restraint system.

Thus, there is need for an improved side impact airbag module which can be produced at a lower cost. There is also a need for a side impact airbag module of reduced size and complexity. There is a further need for a side impact airbag module configured for simplified installation to the seat frame. There is a still further need for a side impact airbag module which provides performance flexibility across various vehicle applications.

SUMMARY OF THE INVENTION

The present invention provides an improved side impact airbag module configured to be attached to the seat frame and hidden by the seat soft trim cover. The airbag of this invention is intended to be deployed through the seat cover's existing sew seam or through a seam that has been particularly designed in the seat cover for side impact airbag escape. The module is designed with a reduced number of components and fasteners by eliminating the hard cover and providing an inflator plate/retainer assembly having integral means for fastening. Furthermore, the module can be easily attached to the seat frame during seat production.

One object of the present invention is to provide an improved airbag module which can be produced at a lower cost.

It is another object of the present invention to improve the manufacturability of the module by providing a side impact airbag module of reduced size and complexity.

It is still another object of the present invention to provide a side impact airbag module which is configured for simplified installation to the seat frame.

It is a further object of the present invention to provide a side impact airbag module with performance flexibility across various vehicle applications.

In order to achieve the foregoing objects, the present invention provides a side impact airbag module consisting of an inflator, an inflator plate, an airbag and a soft cover. The inflator plate is equipped with a tubular inflator which receives a crash signal and generates gas in response thereto. The inflator plate/inflator assembly is held inside a specially designed airbag. The airbag is folded around the inflator plate and secured along with the soft cover to the inflator plate/inflator assembly. The soft cover is configured with the tear seam to allow the airbag to break out. Upon deployment, the airbag breaks through the soft cover and makes its way out of the seat through a seam in the seat soft trim cover. In the preferred embodiment, a one-piece design is achieved through the use of molded plastic or metal components which require only two fasteners (nuts) to attach the module to the vehicle structure. In an alternative embodiment, a simplified stamped steel version is also possible, but will require additional fasteners (i.e. studs and nuts).

One advantage of the present invention is the ability to (by slight changes in shape of the inflator plate) change the direction of the cushion deployment depending on requirements for a particular vehicle. By slightly changing the shape of the inflator plate near the inflation end of the inflator, the direction of the gas from the inflator can be redirected. This allows more control of the direction and placement of the side impact airbag. For example, if vehicle performance in side impact requires the side impact airbag to be deployed more toward the door than the front of the vehicle, this requirement can be achieved by changing the flow direction of the gas from the inflator.

The present invention has fewer failure modes in assembly due to fewer parts. Also, the present invention can be "tuned" to any particular vehicle or any particular vehicle side (driver or passenger). The present invention is easily assembled to the seat frame with few fasteners further reducing costs associated with providing side impact protection.

Further objects, features and advantages of the invention will become apparent from a consideration of the following description and the appended claims when taken in connection with the accompanying drawings.

BRIEF DESCRIPTION OF THE DRAWINGS

FIGS. 5A–5D is an exploded isometric view of the components of the first embodiment of the inflatable restraint module of the present invention;

FIGS. 10A–10D is an exploded isometric view of the components of the second embodiment of the inflatable restraint module of the present invention;

DETAILED DESCRIPTION OF THE PREFERRED EMBODIMENT

Figure 1:
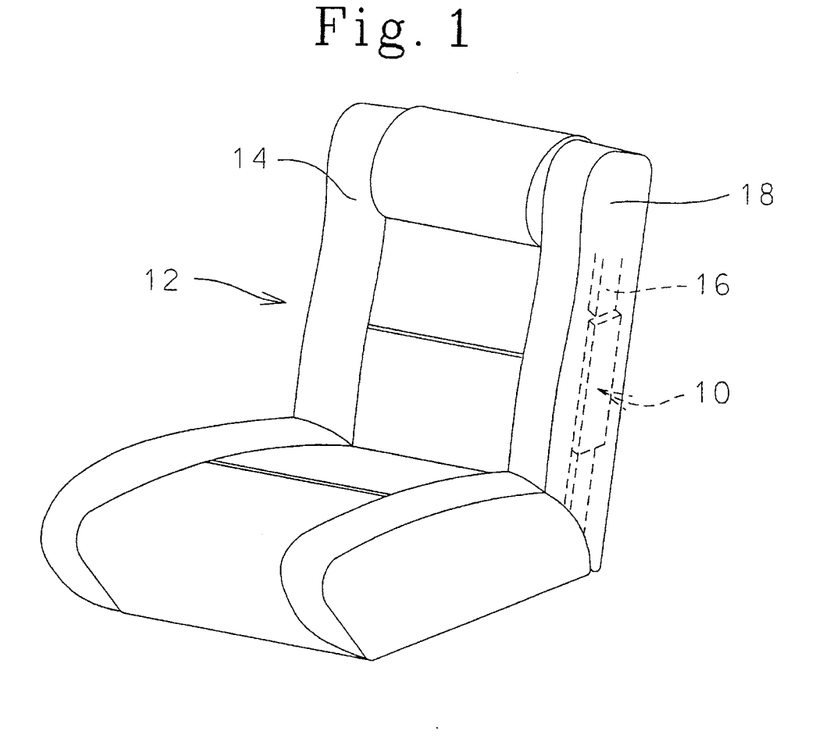
FIG. 1 is a pictorial view of a driver side motor vehicle front seat showing in phantom lines the internally mounted inflatable restrain module in accordance with this invention.
Figure 2:
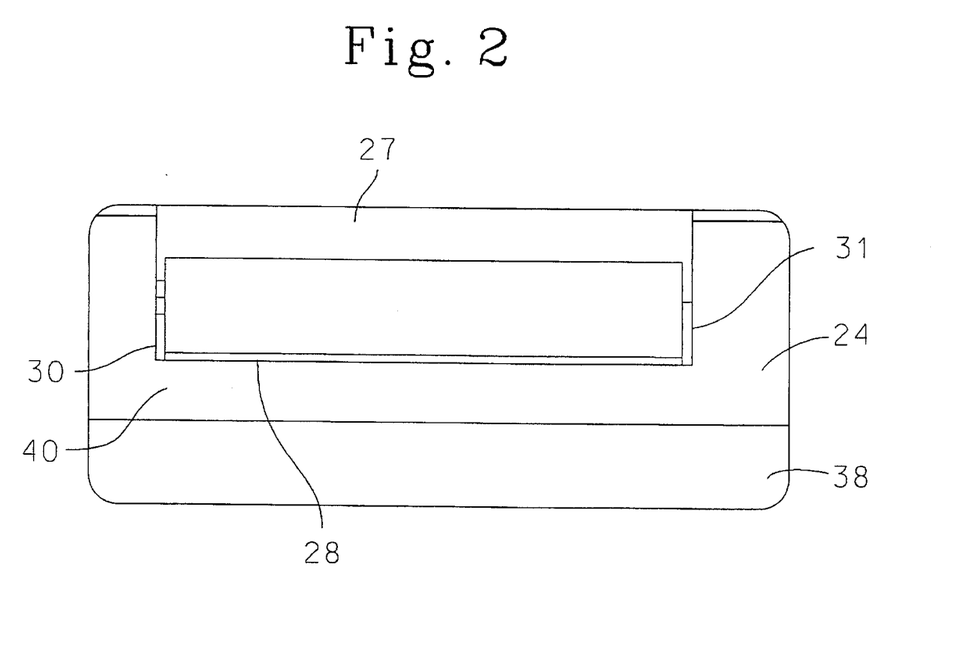
FIG. 2 is a top view of the first embodiment of the inflator plate of the present invention.
Figure 3:
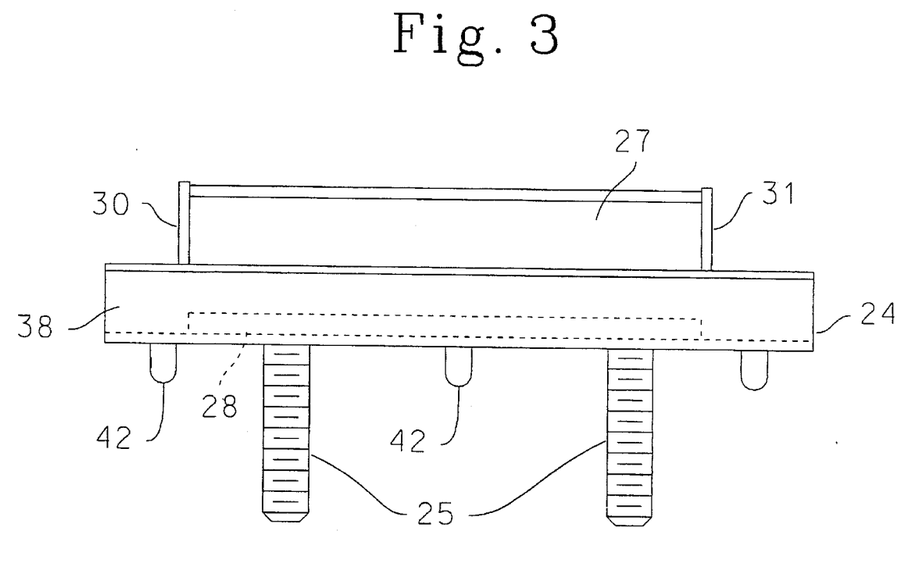
FIG. 3 is a front view of the first embodiment of the inflator plate of the present invention.
Figure 4:
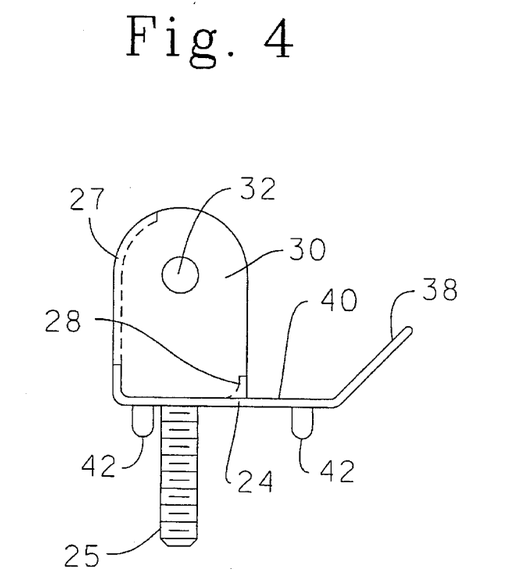
FIG. 4 is a side view of the first embodiment of the inflator plate of the present invention.

Preferred embodiments of the side impact restraint module with soft cover are described herebelow with reference to the drawings, Referring to FIGS. 1–6, the side impact airbag module with soft cover according to this invention is designated generally by reference number 10. FIG. 1 illustrates the module 10 mounted within a motor vehicle seat 12 which is shown as a driver-side seat. The module 10 is mounted internally with the seat back 14 and is fastened to a generally vertically extending seat back frame member 16. The module 10 and seat frame 16 are surrounded by soft foam material covered externally by trim 18. In accordance with conventional inflatable restrain design concepts, the trim 18 features a tear seam which allows the trim 18 to open thus allowing the airbag 20 to deploy outside of the module 10. While in this embodiment the module is shown attached to the seat back, it is contemplated that the module 10 could be attached to the side door, b pillar or other appropriate structure.

The airbag module 10 principally comprises an airbag 20, an inflator 22, an inflator plate 24 and a soft cover 26. The inflator 22 is generally cylindrical in shape and is configured to generate gas for inflating the airbag 20 in response to a signal generated by a crash sensor (not shown) located in the side door area of the motor vehicle. The gas is released from the inflator 22 through an inflation end 23. The inflator plate 24 receives and secures the inflator 22. In the preferred embodiment, the inflator plate 24 is a one piece molded plastic or metal component which is attached to the seat frame 16 using a pair of integrally formed, threaded studs 25. The studs 25 extend through apertures in the seat frame 16 and are secured to the seat frame 16 using threaded nuts.

The inflator plate 24 comprises an integrally formed longitudinal mounting flange 27, a redirecting flange 28 and a mounting plate 30 for holding and securing the inflator 22. The longitudinal mounting flange 27 has a smooth back surface for absorbing energy from the airbag 20 during deployment. The redirecting flange 28 is positioned near the inflation end 23 of the inflator 22 and is configured for redirecting and distributing the gas generated by the inflator 22 into the airbag 20. A significant advantage of the present invention is the ability to (by slight changes in shape of the redirecting flange 28) change the direction of the airbag 20 deployment. By slightly changing the shape of the redirecting flange 28 near the inflation end 23 of the inflator, the direction of the gas generated by the inflator 22 is controllably redirected, thus allowing more control in the direction and placement of the airbag 20. For example, if the vehicle performance requires a side impact airbag to be deployed more toward the door than the front of the vehicle, this requirement can be achieved by changing the flow direction of the gas from the inflator 22 by altering the shape of the redirecting flange 28.

The mounting plate 30, integrally formed with the mounting flange 27, extends perpendicular to the mounting flange 27 and contains an aperture 32 configured to receive a threaded stud end 34 of the inflator 22. The mounting plate 30 and mounting flange 27 act together to secure the inflator 22 in place on the inflator plate 24. The mounting flange 27 is configured to wrap around the inflator 22 to form a pocket into which the inflator 22 is inserted. The mounting plate 30 closes one end of the pocket so that the inflator 22 is inserted into the open end of the pocket, opposite the mounting plate 30, and secured to the mounting plate 30 by inserting the threaded stud end 34 of the inflator 22 through the aperture 32 in the mounting plate 30 and securing the stud end 34 with a nut 36. The other end of the inflator 22 is held in place by a rear mounting plate 31 which is configured to encircle the end of the inflator opposite the inflation end 23.

Figure 5A:
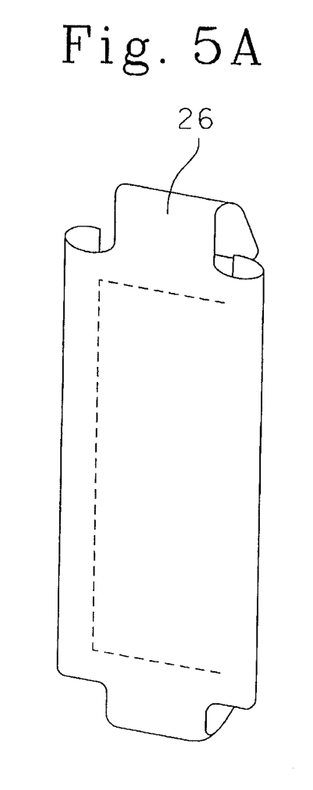
Figure 5B:
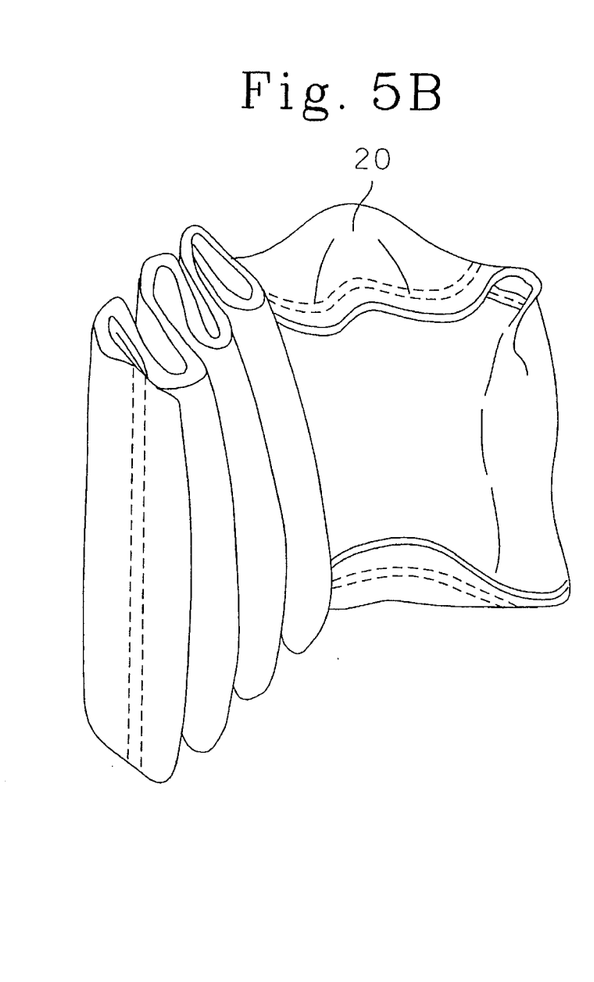
Figure 5C:
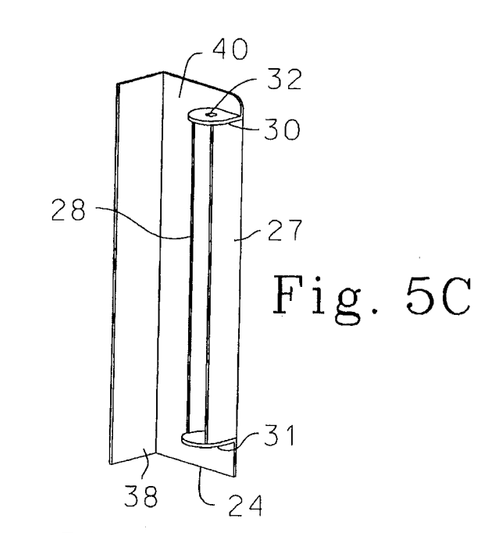
Figure 5D:
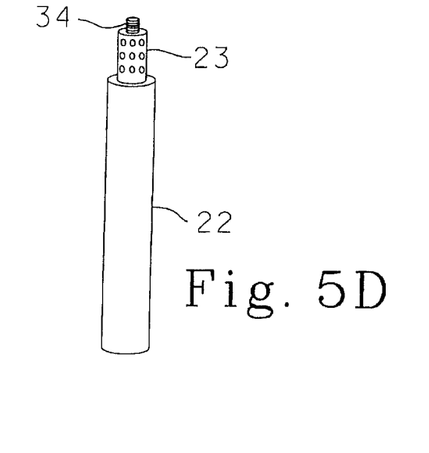
Figure 6:
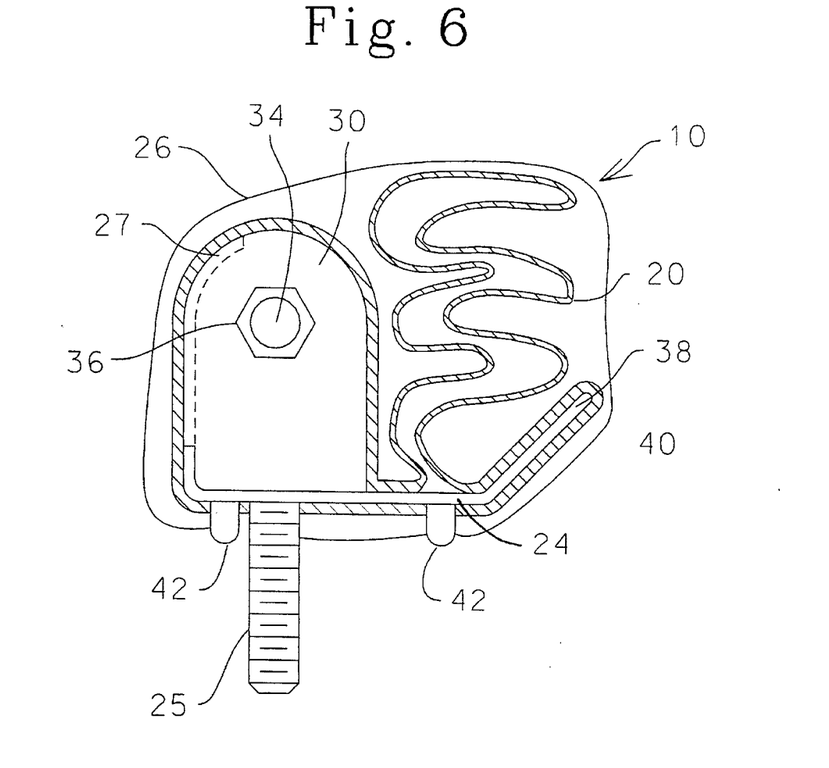
FIG. 6 is a cross-sectional view showing the first embodiment of the inflatable restraint module of the present invention in an undeployed position.
Figure 7:
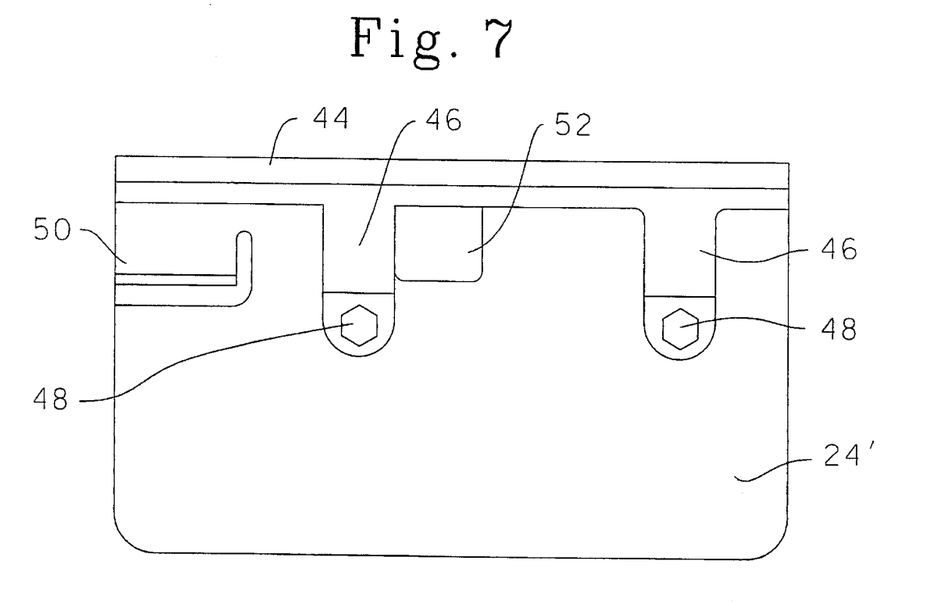
FIG. 7 a top view of a second embodiment of the inflator plate of the present invention.
Figure 8:
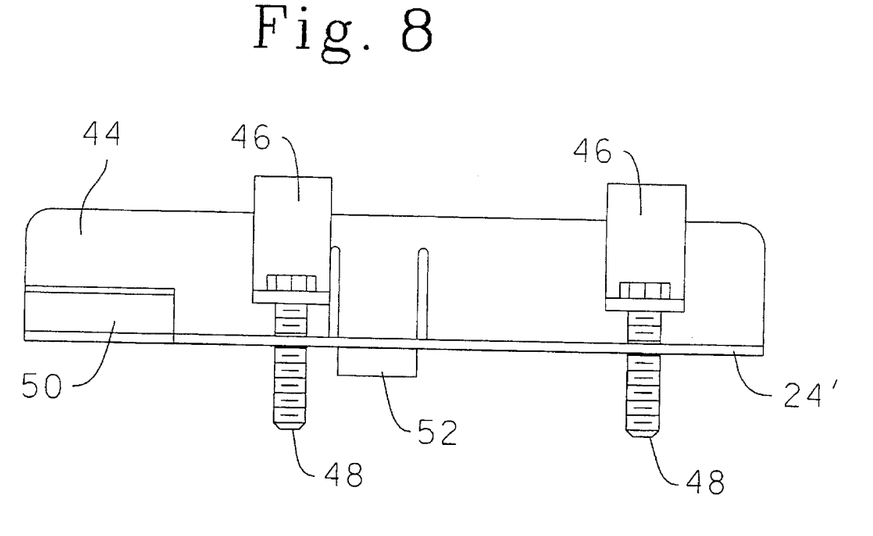
FIG. 8 is a front view of a second embodiment of the inflator plate of the present invention.
Figure 9:
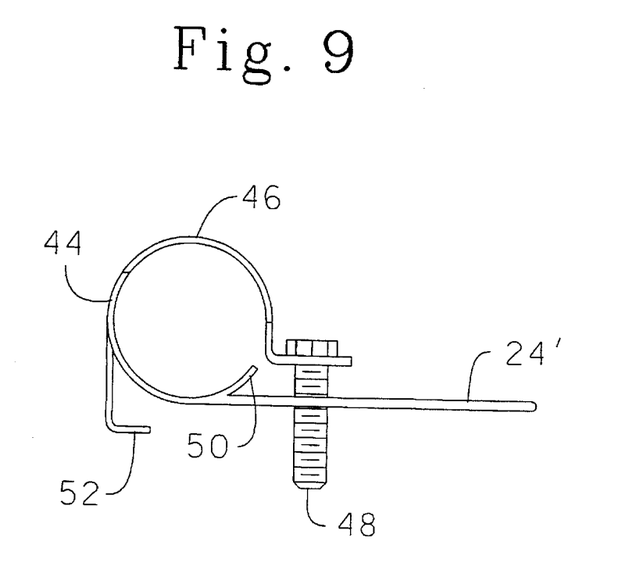
FIG. 9 is a side view of a second embodiment of the inflator plate of the present invention.
Figure 10A:
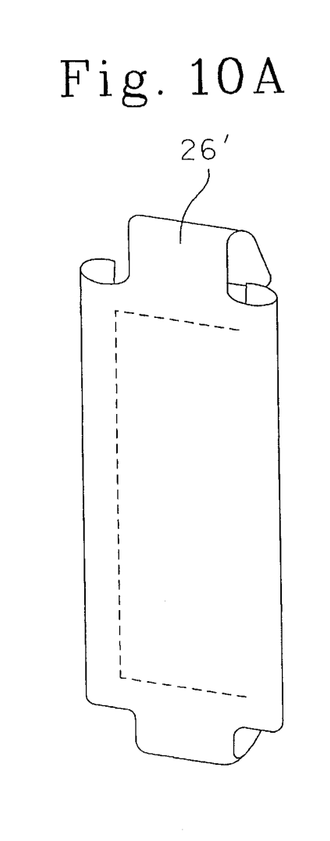
Figure 10B:
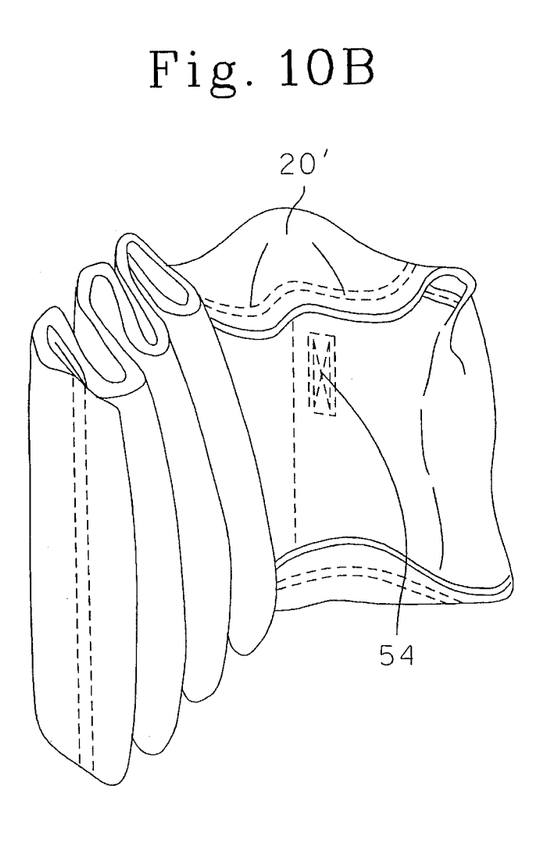
Figure 10C:
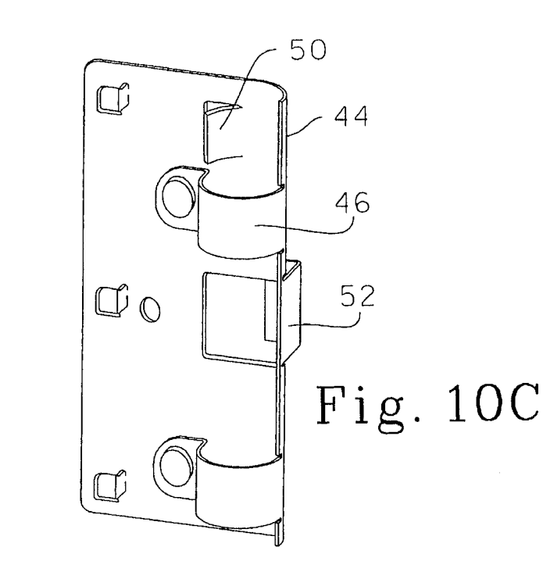
Figure 10D:
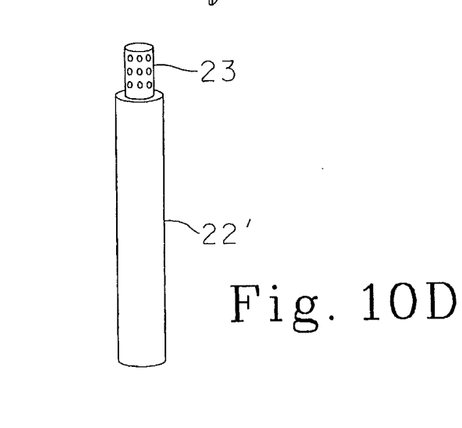
Figure 11:
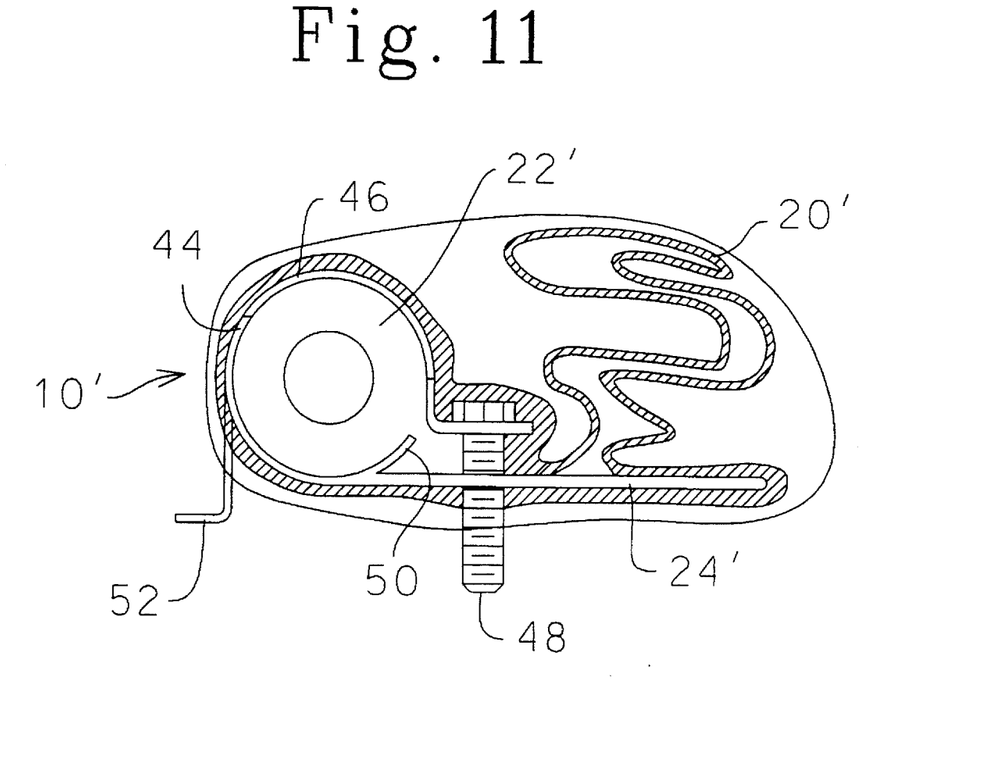
FIG. 11 is a cross-sectional view showing the second embodiment of the inflatable restraint module of the present invention.

The airbag 20 is configured with an elongated slit opening such that the inflator plate/inflator assembly can be inserted into the slit. The airbag 20 is folded around the inflator plate/inflator assembly which is held inside the airbag 20 and is placed in fluid communication with the inflator 22 wherein gas generated by the inflator 22 in response to a crash signal is captured by the airbag 20 thus inflating the airbag 20. In assembling the module 10, the airbag 20 is folded and stored in the module 10 in an undeployed position. The inflator plate 24 is configured to include a longitudinal retaining ridge 38 for providing an airbag holding area 40 in which the airbag 20 is stored when in an undeployed condition.

The module 10 is held in an undeployed condition by a soft cover 26, such as paper sold under the trademark "TYVEK"198 or another similar material. The soft cover 26 is secured to the inflator plate 24 with anchoring pins 42 which are integrally formed on the inflator plate 24. The air bag 20 is also held in place by the anchoring pins 42. Preferably, the pins 42 are configured as tabs which can be inserted through holes in the air bag 20 and soft cover 26 and bent back to secure the air bag 20 and soft cover 26 to the inflator plate/inflator assembly. However, other fasteners, such as rivets or the like, can be used. The soft cover 26 includes a tear seam configured to open during deployment of the airbag 20 to allow the airbag 20 to deploy outside of the module 10.

In a second embodiment, as shown in FIGS. 7–11, the inflator plate 24' features a stamped steel design in which the inflator mounting assembly comprises a longitudinal mounting flange 44 and two mounting straps 46. The mounting straps 46 are configured to wrap around the inflator 22' and are secured to the inflator plate 24' by threaded mounting studs 48. The mounting studs 48 are configured to extend through the inflator plate 24' and are used for attaching the module 10' to a seat back frame. The mounting flange 44 is configured with a smooth back surface which is designed to absorb energy from the air bag 20' during deployment.

A redirecting lip 50 is included on the inflator plate 24' for redirecting and redistributing the gas generated by the inflator 22', in a manner similar to that disclosed above in reference to the redirecting flange 28 of the previous embodiment. A mounting tab 52 is also included on the inflator plate 24'. The mounting tab 52 is used to help secure the air bag to the inflator plate and to anchor the module 10' to the seat frame. The air bag 20' includes a slot opening 54 which is configured to accommodate the mounting tab 52.

It is to be understood that the invention is not limited to the exact construction illustrated and described above, but that various changes and modifications may be made without departing from the spirit and scope of the invention as defined in the following claims.

We claim:

1. An inflatable restraint module comprising:

a generally cylindrical inflator configured for receiving a crash signal from a crash sensor and for generating gas in response thereto;

an inflator plate configured for receiving said inflator, said inflator plate having means for redirecting and distributing said generated gas and having means for attaching said module to the interior of a motor vehicle;

an inflatable airbag defining an interior volume and having an elongated slit opening configured for receiving said inflator plate and inflator, wherein said airbag is folded around said inflator plate in an undeployed position and is positioned in fluid communication with said inflator such that said inflator and said inflator plate are held within said interior volume and gas generated by said inflator in response to said crash signal is captured by said airbag thus inflating said airbag into a deployed position, said means for redirecting comprising an integrally formed longitudinal redirection flange configured to redirect gas flow from said inflator to control the direction of inflation of said airbag; and a soft cover for enclosing said inflator plate, said inflator and said airbag in said undeployed position, said cover having a tear seam configured to open during deployment of said airbag to allow said airbag to deploy outside of the module.

2. An inflatable restraint module according to claim 1, wherein the shape of said redirection flange can be altered to control the flow direction of the inflator gases thus controlling the direction of inflation of said airbag.

3. An inflatable restraint module according to claim 1, further comprising a plurality of pins integrally formed on said inflator plate for anchoring said soft cover and said airbag.

4. An inflatable restraint module according to claim 1, wherein said means for attaching further comprise at least one mounting stud integrally formed on said inflator plate for attaching said module to said seat frame.

5. An inflatable restraint module according to claim 1, wherein said inflator plate further includes a longitudinal retaining ridge configured to provide an airbag holding area for holding said airbag in said folded undeployed position inside said soft cover.

6. An inflatable restrain module according to claim 1, wherein said inflator plate is a single integrally formed piece.

7. An inflatable restraint module according to claim 1, wherein said means for redirecting comprises an integrally formed redirecting flange and said inflator plate further comprising an inflator mounting assembly integrally formed with said inflator plate, said assembly comprising a longitudinal mounting flange and a mounting plate integrally formed with said mounting flange such that said mounting plate extends in a generally perpendicular direction from said mounting flange, said mounting plate having an aperture configured for receiving one end of said inflator such that said inflator is secured directly adjacent to said mounting flange.

8. An inflatable restraint module according to claim 7 further comprising said inflator having a threaded stud projecting from an end of said inflator, said stud being configured to extend through said aperture in said mounting plate such that said inflator is secured to mounting plate using a nut on said stud.

9. An inflatable restraint module according to claim 1 wherein said inflator plate further includes an inflator mounting assembly comprising a longitudinal mounting flange and at least one mounting strap, said mounting ridge having a smooth back surface and configured to engage said inflator and to absorb energy from said airbag during deployment, said at least one mounting strap being configured to wrap around said inflator and to be secured to said inflator plate by at least one mounting stud thus securing said inflator to said inflator plate, said mounting stud being configured to extend through an aperture in said inflator plate for attaching said module to said seat frame.

10. An inflatable restraint module according to claim 9 wherein said means for redirecting comprises a lip formed adjacent to said inflator on said inflator plate said lip configured to redirect gas flow from said inflator to control the direction of inflation of said airbag.

11. An inflatable restraint module according to claim 10 wherein the shape of said lip can be altered to control the flow direction of the inflator gases thus controlling the direction of inflation of said airbag.

12. An inflatable restraint module according to claim 10 further comprising a mounting tab operably connect to said inflator plate, said tab being configured for anchoring said module to said seat frame.

13. An inflatable restraint module comprising:

a generally cylindrical inflator having a threaded stud projecting from an end of said inflator, said inflator configured for receiving a crash signal from a crash sensor and for generating gas in response thereto;

an integrally formed single piece inflator plate configured for receiving said inflator, said inflator plate having an inflator mounting assembly integrally formed with said inflator plate, said assembly comprising a longitudinal mounting flange, a redirecting flange for redirecting and distributing said generated gas and a mounting plate integrally formed with said mounting flange such that said mounting plate extends in a generally perpendicular direction from said mounting flange, said mounting plate having an aperture configured for receiving said threaded stud of said inflator such that said inflator is secured directly adjacent to said mounting flange by extending said threaded stud through said aperture and securing said threaded stud to said mounting plate using a nut;

means for attaching said module to a motor vehicle interior, said means for attaching integrally formed with said inflator plate;

an inflatable airbag defining an interior volume and having an elongated slit opening configured for receiving said inflator plate and inflator, wherein said airbag is folded around said inflator plate in an undeployed position and is positioned in fluid communication with said inflator such that said inflator and said inflator plate are held within said interior volume and gas generated by said inflator in response to said crash signal is redirected by said redirecting flange and captured by said airbag thus inflating said airbag into a deployed position wherein said redirecting flange redirects the gas flow from said inflator in a controlled manner to control the direction of inflation of said airbag, said mounting flange configured having a smooth back surface for absorbing energy from said airbag during deployment; and a soft cover for enclosing said inflator plate, said inflator and said airbag in said undeployed position, said cover having a tear seam configured to open during deployment of said airbag to allow said airbag to deploy outside of the module.

14. An inflatable restraint module according to claim 13, wherein the shape of said redirecting flange can be altered to control the flow direction of the inflator gases thus controlling the direction of inflation of said airbag.

15. An inflatable restraint module according to claim 13, further comprising a plurality of pins integrally formed on said inflator plate for anchoring said soft cover and said airbag.

16. An inflatable restraint module according to claim 13, wherein said means for attaching further comprise at least one mounting stud integrally formed on said inflator plate for attaching said module to said motor vehicle interior.

17. An inflatable restraint module according to claim 13, wherein said inflator plate further includes a longitudinal retaining ridge configured to provide an airbag holding area for holding said airbag in said folded undeployed position inside said soft cover.

18. An inflatable restraint module comprising:

a generally cylindrical inflator configured for receiving a crash signal from a crash sensor and for generating gas in response thereto;

an inflator plate configured for receiving said inflator, said inflator plate including a longitudinal mounting flange and at least one mounting strap, said mounting flange having a smooth back surface and configured to engage said inflator, said at least one mounting strap being configured to wrap around said inflator and to be secured to said inflator plate by at least one mounting stud thus securing said inflator to said inflator plate, said mounting stud being configured to extend through an aperture in said inflator plate for attaching said module to said seat frame;

a redirecting lip formed adjacent to said inflator on said inflator plate for redirecting and redistributing said generated gas;

an inflatable airbag defining an interior volume and having an elongated slit opening configured for receiving said inflator plate and inflator, wherein said airbag is folded around said inflator plate in an undeployed position and is positioned in fluid communication with said inflator such that said inflator plate and said inflator are held within said interior volume and gas generated by said inflator in response to said crash signal is redirected by said lip and captured by said airbag thus inflating said airbag into a deployed position wherein said redirecting flange redirects, in a controlled manner, the gas flow from said inflator to control the direction of inflation of said airbag, said mounting flange being configured to absorb energy from said airbag during deployment; and a soft cover for enclosing said inflator plate, said inflator and said airbag in said undeployed position, said cover having a tear seam configured to open during deployment of said airbag to allow said airbag to deploy outside of the module.

19. An inflatable restraint module according to claim 18, wherein the shape of said lip can be altered to control the flow direction of the inflator gases thus controlling the direction of inflation of said airbag.

20. An inflatable restraint module according to claim 18, further comprising a plurality of pins integrally formed on said inflator plate for anchoring said soft cover and said airbag.

21. An inflatable restraint module according to claim 18 further comprising a mounting tab operably connect to said inflator plate, said tab being configured for securing said air bag to said inflator plate and for anchoring said module to said seat frame.

22. An inflatable restraint module according to claim 18, wherein said inflator plate further includes a longitudinal retaining ridge configured to provide an airbag holding area for holding said airbag in said folded undeployed position inside said soft cover.

* * * * *

UNITED STATES PATENT AND TRADEMARK OFFICE
CERTIFICATE OF CORRECTION

PATENT NO. : 5,564,739
DATED : October 15, 1996
INVENTOR(S) : Phillip K. Davidson It is certified that error appears in the above-indentified patent and that said Letters Patent is hereby corrected as shown below:

Column 6, Line 24, Claim 6, after "inflatable" delete "restrain" and insert —restraint—.

Column 6, Line 43, Claim 8, after "to" insert —said—.

Column 8, Line 52, Claim 21, after "operably" delete "connect" and insert —connected—.

Signed and Sealed this

Twenty-first Day of January, 1997

Attest:

BRUCE LEHMAN

Attesting Officer

Commissioner of Patents and Trademarks